L. H. SARGENT.
DEVICE FOR CLEANING WELLS.
APPLICATION FILED OCT. 29, 1918.
1,314,833.
Patented Sept. 2, 1919.
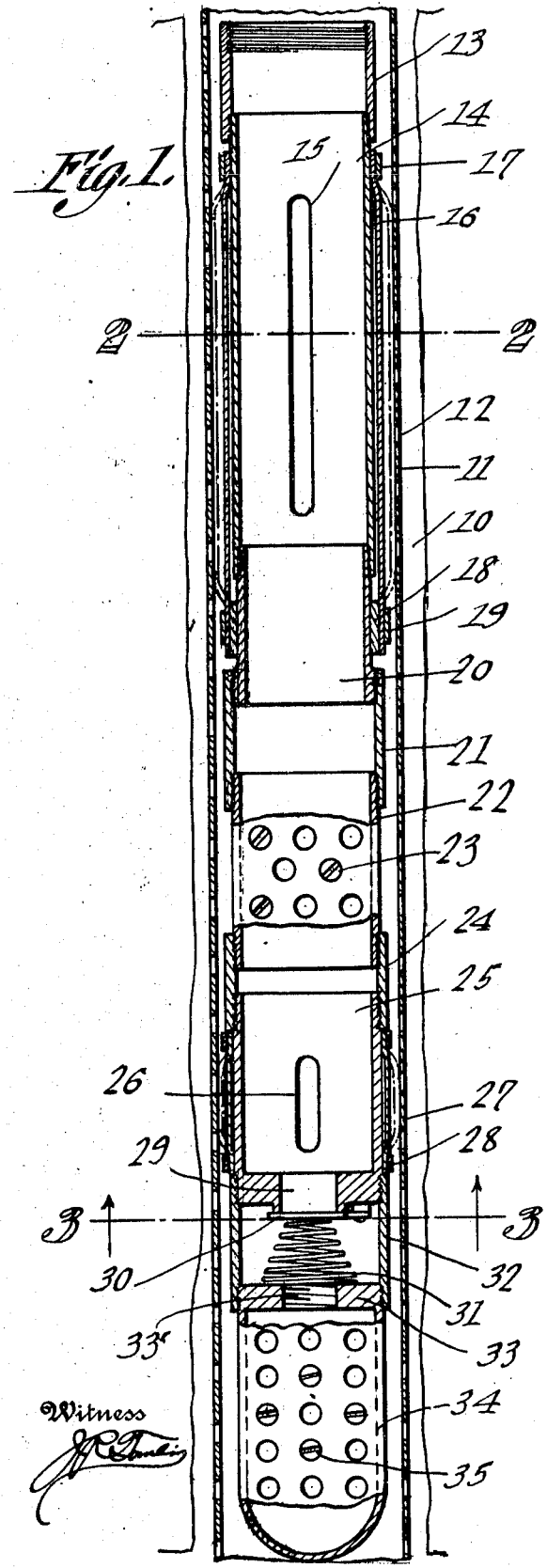
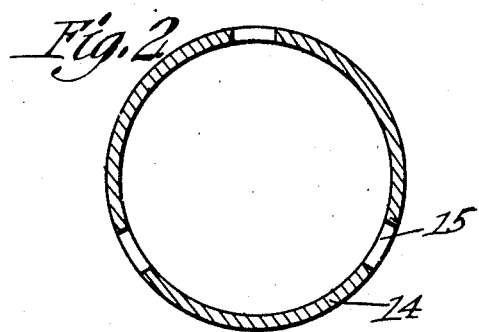
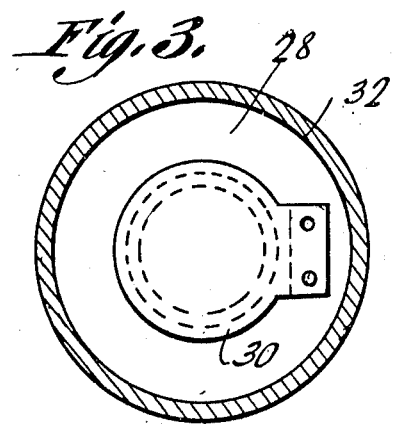
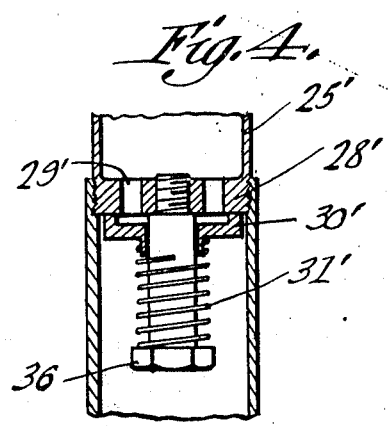
L. H. Sargent
Inventor

UNITED STATES PATENT OFFICE.

LEMUEL H. SARGENT, OF FORT WORTH, TEXAS.

DEVICE FOR CLEANING WELLS.

1,314,833.     Specification of Letters Patent.     Patented Sept. 2, 1919.

Application filed October 29, 1918. Serial No. 260,116.

*To all whom it may concern:*

Be it known that I, LEMUEL H. SARGENT, a citizen of the United States, residing at Fort Worth, in the county of Tarrant and State of Texas, have invented a new and useful Device for Cleaning Wells, of which the following is a specification.

The subject of this invention is an automatic self adjusting device for cleaning wells and is adapted more especially for cleaning Artesian wells and oil wells, which have become clogged and because of which the production is practically or entirely stopped, and restoring the original production of such wells, also in reclaiming gas wells which have become flooded, the production thereby being cut off.

The main object of the invention is the provision of an automatic self adjusting well cleaner—the positive operation of which is attained and secured by the longitudinal movement of the automatic self adjusting movable collar to which one end of the flexible packer is attached, thereby permitting the walls of the flexible packer, when under pressure, to distend without danger of rupture, and to engage the inner walls of the screen or strainer immediately adjacent thereto, thereby effectually plugging that particular portion of the screen or strainer—thereby providing a method by the use of this device for plugging the well at predetermined points.

Another object of the invention and device, is to provide a method for correctly regulating the pressure applied to the device for plugging such wells, in order to properly operate and use such cleaner.

Another object of the invention and device is to provide a method for introducing fluids into the well or wells, and controlling and directing the course of fluid used to clean or wash wells, and to deliver said fluids under pressure to predetermined parts, or locations in the well, and to control and regulate the pressure thereby applied; and to remove obstructions and accretions of all kinds such as, paraffin, asphalt, sand, shale, and other hard or gummy substances from the interstices, and from the outside surface of the screen or strainer, with the same in position in the well and also to remove and clean out all debris left from the drilling or boring of the well which may have settled to the bottom of the well and also to remove such part of the formation surrounding the screen or strainer as may tend to crumble and fall in thereby clogging the screen or strainer and preventing the ingress of fluids through the interstices of the screen or strainer and into the bore of the well.

Another object of the invention or device is to discover the formation of any strata encountered or found in the process of drilling or boring for oil, or gas. Another object of the invention or device is to control or prevent the passage of fluids or gases from one stratum to another in the formation, while drilling or boring for oil, or gas, and also to separate and cut off any stratum or strata in the formation from the balance of the well and thereby control the production of such stratum or strata.

The invention and device also contemplates generally improving the construction of, and increasing the range of operation and enhancing the utility of well cleaners.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical structure for carrying out the invention is illustrated in the accompanying drawing, wherein:—

Figure 1 is a fragmentary view in vertical, longitudinal section of a well casing, with a cleaner constructed in accordance with the invention in place therein;

Fig. 2 is a cross section of the cleaner, the flexible packer removed, taken on the line 2—2 of Fig. 1;

Fig. 3 is a cross section taken on the line 3—3 of Fig. 1;

Fig. 4 is a detail view in longitudinal section of a modified form of control valve.

Referring to the drawing by numerals of reference:—

The bore of a well is indicated at 10, and inserted in the well is the usual screen or strainer 11, the lowermost section of which is herein shown provided with perforations 12. The perforated lower end of the well screen or strainer is usually wrapped with wire, not shown, which covers the perforations and prevents sand and dirt from entering through the perforations but, at the same time, allows the oil or water to filter through into the screen or strainer.

The perforations 12, and the wire overlying them, in time become clogged with sand, dirt, paraffin, or the like, greatly interfering with or entirely cutting off the proper flow of liquid into the well. It then becomes necessary in order to restore the production of such wells to remove such obstructions and accretions from the outside of the screen or strainer and from the interstices or openings through the screen or strainer in order to permit the free entrance of the fluids through the screen or strainer into the well and by so doing restore the production of the said well.

Threaded into the coupling 13 is a fixed tubular section 14, forming the body of the device and provided with longitudinal slots 15, herein shown as three in number. Surrounding the section is a covering of flexible material 16, which is wrapped around section 14 and is firmly attached to the stationary end of the said section 14 by an encircling clamp 17, or other suitable means. The movable end of the flexible covering 16, is fastened and attached to a movable collar 18, in the same manner as the stationary end is attached, thus forming a flexible packer, and it is so called hereinafter. The collar 18 moves freely on a short tubular section 20, which is threaded into the lower end of section 14, which forms the stop to the upward movement of the collar 18.

Coupled to the lower end of the section 20 by means of a coupling 21 or otherwise is a perforated section 22, the perforations of which may be closed by screw plugs 23 or like means. Such perforations as may be necessary are closed by the plugs 23 for the purpose of regulating and controlling the amount of flow of the liquid from section 21 through the perforations and by so doing regulating and controlling the pressure in the space inclosed between section 14 and covering or packer 16, which pressure causes the flexible packer 16 to adjust itself between the body of the cleaner 14, and the inside walls of the screen or strainer, and thus prevent any return of fluid used between the inside walls of the screen or strainer and the flexible packer 16.

A coupling 24, threaded on the lower end of the perforated section 22, serves to secure a short section 25 in place below the perforated section. The section 25 is likewise provided with slots, 26, formed longitudinally thereof, and this section is encircled by a flexible covering, the ends of which are fastened in place on the section by means of clamps 28, or otherwise. The packer 27 is formed of flexible material so that, when fluid is introduced into the cleaner and placed under pressure in the screen or strainer, it will distend and engage the sides of the screen or strainer 11 to prevent the passage of fluid between the screen or strainer 11 and flexible packer 27.

The lower end of the short section 25 is formed with a head 28 in which is an aperture 29, closed by a valve 30, herein shown as a back pressure valve. The valve 30 is normally held upon its seat by a compression spring 31 which is housed by a coupling 32, which coupling is threaded on the lower end of the section 25. The compression spring 31 is seated on the headed end 33 of a perforated bull plug 34, the perforations of which may be closed by plugs 35, for the purpose herein set forth. The bull plug 34 is threaded into the coupling 32 and its end 33 is provided with an opening 33' to allow the passage of liquid from the tubing into the bull plug 34.

In the modified form of valve shown in Fig. 4, the section 25' is formed with a head 28' which is provided with apertures 29' to allow the passage of fluid. A bolt 36 is threaded into the head 28' and a valve 30' encircles and is slidable on this bolt. The bolt is encircled by a coiled compression spring 31' which is confined between the head of the bolt and the valve 30' and serves to keep the valve upon its seat.

The operation of the device is as follows:—

When a well is to be cleaned, the cleaner is attached to a string of pipe and lowered into the well. By means of a force pump at the top of the well, oil, water, gasolene, steam or the like is forced through the pipe and into the cleaner. When the fluid enters section 14 of the cleaner, it will pass through the slots 15, into the space inclosed between the section 14 and the flexible packer 16, distending and forcing the packer against the inner wall of the screen or strainer and completely dividing that part of the well below the cleaner from the upper part or portion; this result is secured in this device by the movement of the collar 18, to which the lower end of the flexible packer 16 is attached. With the proper number of perforations plugged the pressure within the pipe and cleaner can be so regulated and controlled that the pressure of the fluid on the outside of the cleaner which is being forced through the perforations in the screen or strainer will not be sufficient to crush in the flexible packers 16 and 27. The fluid which is expelled from the perforations of the cleaner and forced through the perforations in the screen or strainer will return outside of the screen or strainer to a point above that portion of the screen or strainer which is packed off and plugged by the flexible packers 16 and 27, and then flow upwardly and out over the top of the casing. This operation will effectually clean out and remove all foreign substances and accretions from the well, screen or strainer, both from the interstices and the outside of the well, screen or strainer and carry them by return flow of fluid over the top of the casing and out of the well.

When it is desired to cut off a certain section of the lower part of the well, as when water is flowing from below into a gas well, that part of the cleaner above the short section may be removed and the section 25 coupled directly to the string of pipe. The device is then lowered to a position below the gas stratum and above the water stratum. A specially prepared cement, or like substance, is then forced through the pipe to distend the flexible packer 27 against the walls of the well and be forced through valve 30, which valve will prevent upward flow of the cement or other liquid when pressure from above is relieved. The pipe may then be unscrewed from the section 25, leaving it in the well which, with the cement, will effectually plug the well.

From the foregoing it will readily be apparent that the flexible packer 16, because of the movement of the collar 18, is protected from rupture under the pressure of the fluid and is permitted to seat firmly against the inside wall of the screen or strainer, thus preventing the return of any of the fluid used between the flexible packer 16 and the inside of the screen 11. This effectually packs off and plugs the screen or strainer at the desired place.

What I claim is:—

1. A well cleaner including a fixed, slotted tubular member having an outlet, a tubular member connected to the lower end of the fixed member, a collar alining with the fixed member and slidable on the other tubular member, a flexible packer surrounding the fixed member and secured at one end thereto and at its other end to the collar, thereby to form an automatic packer allowing retrograde movement of the collar, which movement, when pressure is relieved, automatically releases the packer, a perforated tubular member coupled to the lower end of the lower tubular member, and means for closing such of said perforations as may be necessary to control the pressure of the fluid by which the cleaner is operated.

2. A well cleaner, composed of tubular members, an automatic flexible packer connected therewith, a perforated tubular member coupled thereto, means for closing such perforations—a coupling attached to the perforated tubular member, an automatic flexible packer for connection with the coupling, the same provided with a discharge orifice, a valve normally closing the discharge orifice, a perforated cap below said orifice and means for regulating the discharge of fluid through the cap.

3. A well cleaner, including a tubular member provided with openings, a sleeve encircling the member and overlying the openings and having one end secured to the member, means slidable longitudinally of the member for connecting the other end of the sleeve thereto, the said member having an outlet, and means for regulating the passage of fluid through the outlet.

4. A well cleaner, including a tubular member provided with openings, a flexible sleeve encircling the member and overlying the openings, one end of the sleeve secured to the member, a collar slidable on the member, means for connecting the other end of the sleeve to the collar, the said member having an outlet, and means for regulating the passage of fluid through the outlet.

5. A well cleaner, including a tubular member provided with openings, a flexible sleeve encircling the member and overlying the openings, means for binding the ends of the sleeve to the member, the member provided with a discharge orifice, a perforated bull-plug secured to the member, and means for regulating the discharge of fluid through the plug.

In testimony that I claim the foregoing as my own, I have hereto affixed my signature in the presence of two witnesses.

LEMUEL H. SARGENT.

Witnesses:
PEYTON E. WADE,
P. E. GLENN.